(No Model.)
T. J. LOWELL.
GRASS CATCHER FOR LAWN MOWERS.
No. 576,787. Patented Feb. 9, 1897.
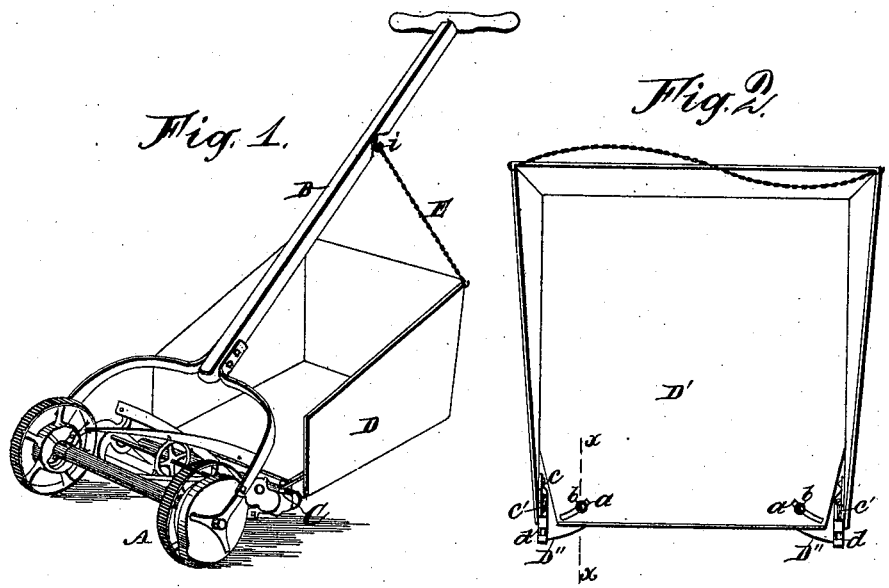
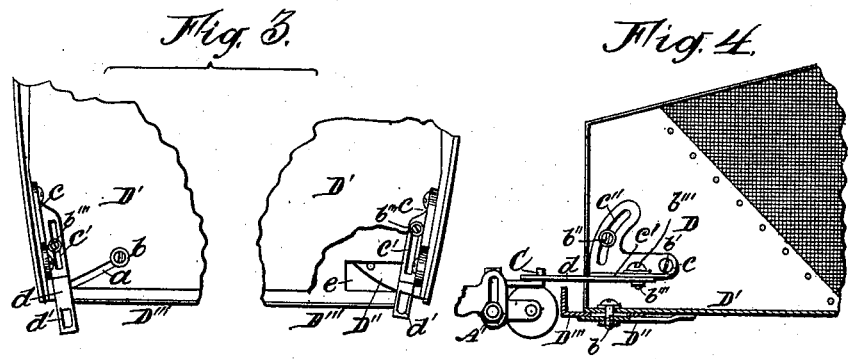
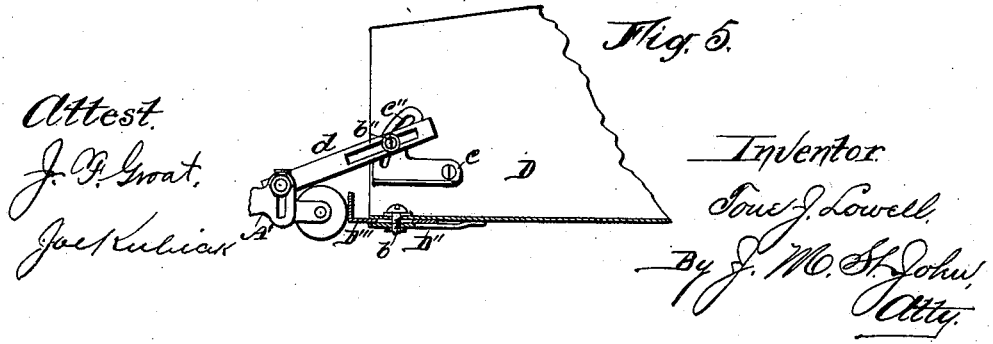
Attest.
J. F. Groat.
Joe Kulias
Inventor
Tone J. Lowell,
By J. M. St. John,
Atty.

UNITED STATES PATENT OFFICE.

TONE J. LOWELL, OF CEDAR RAPIDS, IOWA.

GRASS-CATCHER FOR LAWN-MOWERS.

SPECIFICATION forming part of Letters Patent No. 576,787, dated February 9, 1897.

Application filed July 1, 1896. Serial No. 597,738. (No model.)

*To all whom it may concern:*

Be it known that I, TONE J. LOWELL, a citizen of the United States, residing at Cedar Rapids, in the county of Linn and State of Iowa, have invented certain new and useful Improvements in Grass-Catchers for Lawn-Mowers; and I do hereby declare the following to be a full, clear, and exact description of the invention, such as will enable others skilled in the art to which it appertains to make and use the same.

The object of this invention is to produce a grass-catcher for lawn-mowers which is adapted to be attached to any type of such mowers and is adjustable to a considerable variation in the size thereof.

A device embodying the invention will be hereinafter fully set forth and claimed, reference being had to the accompanying drawings, in which—

Figure 1 is a front view of the device in perspective as applied to an ordinary mower. Fig. 2 is a plan view of the same detached. Fig. 3 is a fragmentary plan view showing an adjustable front end plate in connection with other parts. Fig. 4 is a fragmentary sectional view as seen from the right of the line $x\ x$ of Fig. 2. Fig. 5 is a similar view showing another way of connecting the grass-receptacle with the mower.

Similar letters of reference indicate corresponding parts.

In the drawings, A designates a lawn-mower of a well-known type, which in many cases is provided with a spur or lug C for the convenient attachment of a grass-catcher—as, for example, the later styles of the mower known as the "Pennsylvania."

B is the handle, provided with a suitable hook or the like $i$ to engage a chain E, suspending the rear of the receptacle D.

The grass-receiver D is a rectangular box preferably made of sheet metal, such as tin or galvanized iron, suitably stiffened with wire at the edges and open at the top and forward end. The top is made a little larger than the bottom D', so that a number may be nested for convenience in shipping. The sides for some distance back from the front edge are separated from the bottom and are provided with an inwardly-turned wing D'', conterminous with such separation, lying under and parallel with the bottom. Each wing is provided with a suitable hole for a bolt $b$, which also passes through a curved slot $a$ and admits of the front end of the side being moved inwardly or outwardly and secured in any desired position. In this manner the width of the grass-catcher at the front end where it attaches to the mower may be accurately adjusted to the width of said mower.

The device for attaching the catcher to the mower consists of an adjustable bracket $c$, connected to each side of the grass-receptacle by a pivot-bolt $b'$. A segmental slot $c''$, with another bolt $b''$, passing through it and the side of the receptacle, allows for movement of the front end of the bracket up or down, as desired. A wing $c'$, with a longitudinal slot for a bolt $b'''$, takes an attached plate $d$, having a hole $d'$ in the front end to engage the spur C, above referred to.

By means of the longitudinal adjustment of the plate $d$ the grass-catcher may be set just right with respect to the rear roller of the mower, while the adjustment of the bracket secures any desired elevation of it at the forward end. Provision is also made for extending the bottom of the grass-receptacle itself, though in practice this is not often necessary. This consists of a supplemental bottom-plate D''', with an upturned flange at the forward edge to retain the grass and keep it away from the roller. This supplemental plate is clamped between the bottom D' and the wings D'' D'', a large hole $e$ at each end allowing for the bolt $b$ to pass through in any desired position of the parts.

It will be understood that the body or horizontal portion of this extension-plate D''' is made wide enough so as to be clamped between the parts D' and D'', with the bolts $b\ b$ passing through all the parts, the large holes $e\ e$ allowing for backward and forward adjustment of the plate D''' and for lateral adjustment of the side pieces of the receptacle.

In case the lug C is absent, as it is in many mowers, the grass-catcher is conveniently attached by disconnecting the plate $d$ from the wing $c'$ and bolting it to the side of the bracket, as shown in Fig. 5. The detached bolt may then be used for connecting it to the side of the casting A', to which the rear roller of the mower is journaled.

It will be understood that the forward edge of the bottom, whether the bottom be fixed or extensible, has an upturned flange, as shown, to prevent the grass from working forward onto the roller. After once the receptacle is adjusted to the mower the forwardly-projecting ends of the wings D" D" should be bent up to correspond with this flange, as may be easily done. These forwardly-extending portions of the wings serve only to close a small gap at each end of the front side and, except for this not very important feature, need not be bent up at all. In Fig. 2 the device is shown as adapted to be turned up after being adjusted to position, while in the other figures of the drawings the wing extends forward no more or but slightly more than the side piece.

In case the receptacle is mounted on the lugs C C the forward end may be very easily detached from the mower for dumping. When fastened the other way, the contents are more easily removed by lifting them out with the hands.

In practice I prefer a receptacle made wholly of sheet metal, but in Fig. 4 is illustrated a construction by which the greater portion of the sides and end may be made of canvas. This canvas is attached to the sheet-metal bottom and a short portion of the forward ends of the sides in some suitable way, as by rivets, the wire with which the upper edge of the receptacle is provided serving to support the upper edge of the canvas.

Having thus described my invention, I claim—

1. In a grass-catcher for lawn-mowers, the combination of a receptacle having its sides separated from the bottom some distance back from the open front thereof, and provided with overlapping wings, slots in the bottom, and bolts passing through said wings and bottom, whereby the front end of the receptacle may be made wider or narrower, as described.

2. The combination in a grass-catcher for lawn-mowers, of a receptacle having sides which at the forward end are adjustable inwardly or outwardly, and a longitudinally-adjustable, auxiliary bottom plate, substantially as described.

3. In a grass-catcher for lawn-mowers, the combination with laterally-adjustable sides, of a vertically-adjustable bracket connecting therewith, and a longitudinally-adjustable plate connecting with said bracket, and adapted to engage a lug on the mower, as described.

4. In a grass-catcher, the combination with the laterally-adjustable side of the receptacle, of the bracket $c$, having adjusting-slot $c''$ and slotted wing $c'$, the plate $d$, having hole $d'$, and bolts $b'$, $b''$ and $b'''$, substantially as and for the purpose set forth.

In testimony whereof I affix my signature in presence of two witnesses.

TONE J. LOWELL.

Witnesses:
J. M. ST. JOHN,
J. F. GROAT.